United States Patent [19]

Gu

[11] Patent Number: 4,701,060
[45] Date of Patent: * Oct. 20, 1987

[54] FOIL JOURNAL BEARING COOLING

[75] Inventor: Alston L. Gu, Rancho Palos Verdes, Calif.

[73] Assignee: The Garrett Corporation, Los Angeles, Calif.

[*] Notice: The portion of the term of this patent subsequent to Nov. 11, 2003 has been disclaimed.

[21] Appl. No.: 889,652

[22] Filed: Jul. 24, 1986

[51] Int. Cl.⁴ ............................................. F16C 32/06
[52] U.S. Cl. .................................................... 384/106
[58] Field of Search ................ 384/103, 104, 105, 106

[56] References Cited

U.S. PATENT DOCUMENTS 3,615,121 10/1971 Barnett et al. .
3,893,733 7/1975 Silver et al. .
4,153,315 5/1979 Silver et al. .
4,178,046 12/1979 Silver et al. .
4,195,395 4/1980 Silver et al. .
4,227,753 10/1980 Wilcock .
4,247,155 1/1981 Fortmann .
4,621,930 11/1986 Gu et al. .............................. 384/105

Primary Examiner—Lenard A. Footland
Attorney, Agent, or Firm—Albert J. Miller

[57] ABSTRACT

Cooling is provided for a foil journal bearing by means of flow openings in the individual overlapping foils without adversely affecting the compliance of the foils.

14 Claims, 6 Drawing Figures

U.S. Patent  Oct. 20, 1987  4,701,060
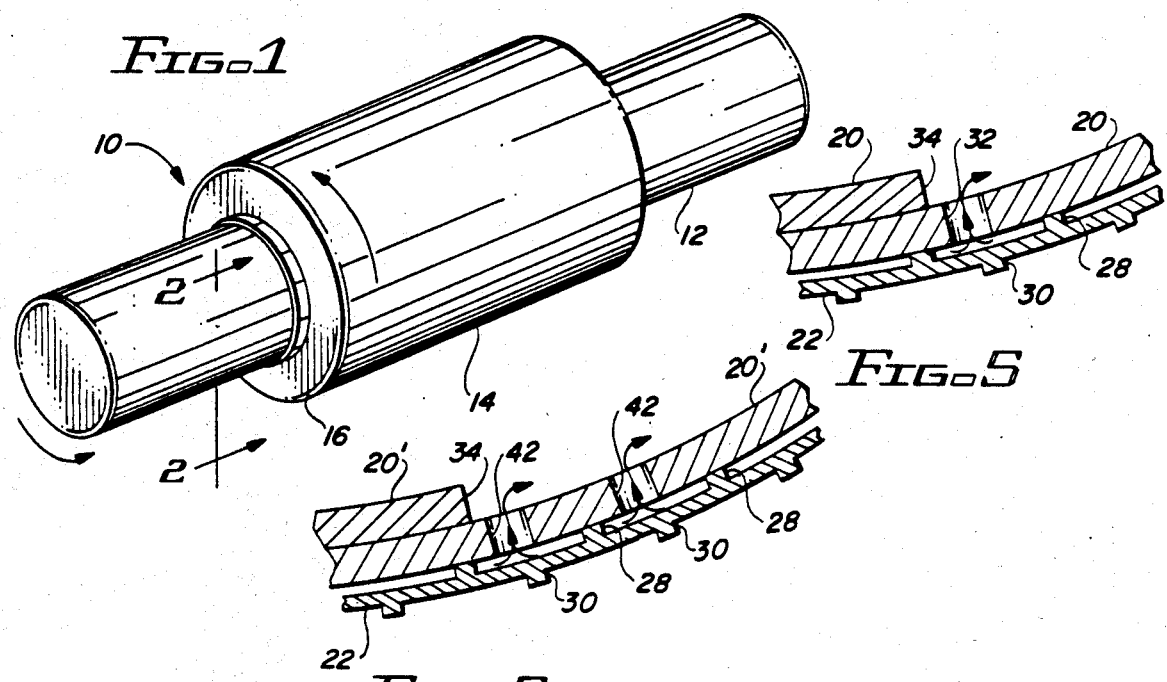
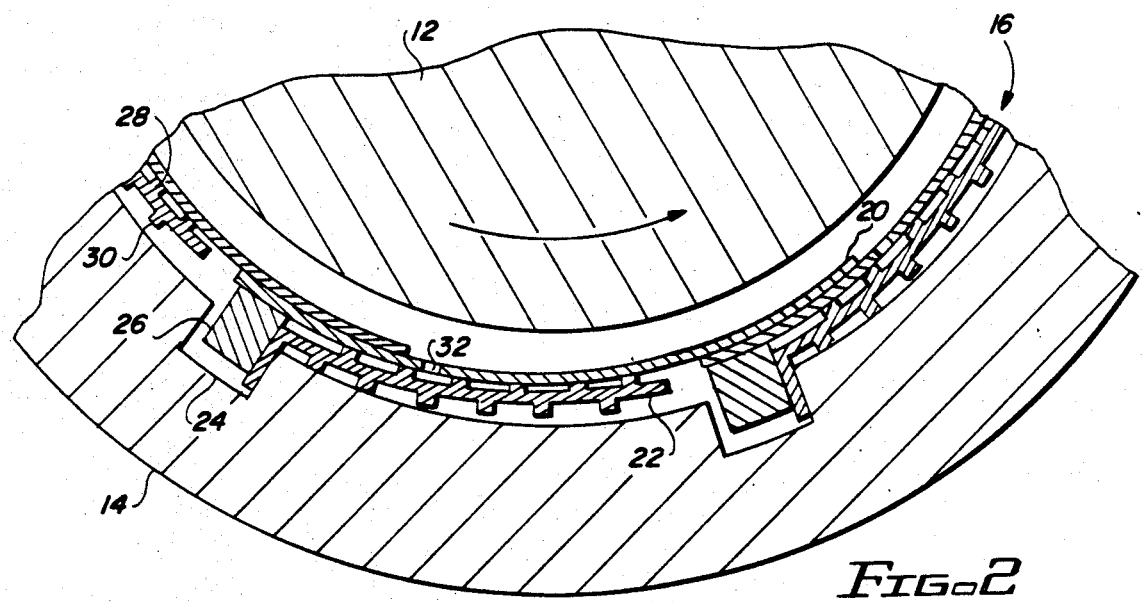
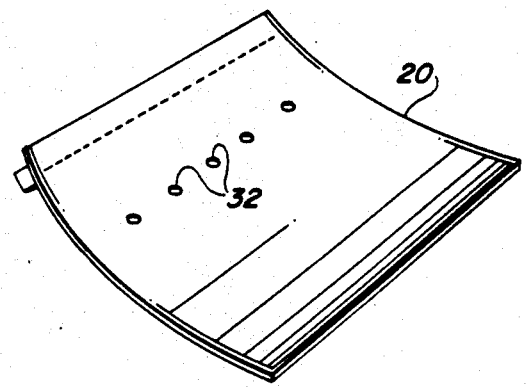
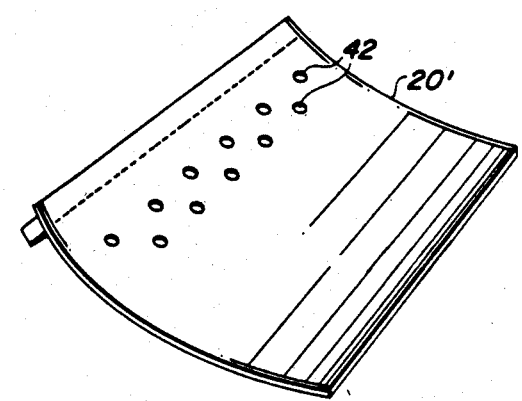

4,701,060

FOIL JOURNAL BEARING COOLING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. In journal bearings, it is conventional practice to mount the individual foils in a slot or groove in one of the bearing elements as exemplified in U.S. Pat. No. 3,615,121.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foils to supply this required preload as exemplified in U.S. Pat. Nos. 3,893,733 and 4,153,315.

In order to facilitate start-up and to reduce bearing wear, the bearing surfaces of the individual foils may be coated with a high lubricity material such as a stratified fluorocarbon, molybdenum disulfide, graphite fluoride, or the like. The use of such coatings, while enhancing the life of the foil bearing, introduces certain operating temperature limitations thereon. As still higher temperature environments are envisioned for foil bearing operation, the temperature limitations of these coatings become critical since they cannot survive as high a temperature as the underlying generally metallic foil. Thus, higher temperature coatings must be developed or means found to limit the operating temperature at the coated foil bearing surfaces. Examples of prior cooling schemes for foil thrust bearings can be found in U.S. Pat. Nos. 4,227,753 and 4,247,155 and in U.S. patent application Ser. No. 656,399, filed Oct. 1, 1984 by Alston Lee-Van Gu entitled "Foil Thrust Bearing Cooling" and assigned to the same assignee as this application, now U.S. Pat. No. 4,621,930.

SUMMARY OF THE INVENTION

In the present invention, the foil journal bearing is provided with openings in the individual overlapping foils to enable the flow of cooling fluid from beneath the foils to the upper surface of the foils. The openings are located in the vicinity of the beginning of the hydrodynamic supporting wedge near the overlap from adjacent foils. Where an underspring is utilized, the openings should be over a lower ridge so as not to restrict the flow of cooling fluid from around the underspring to the cooling holes in the individual foils. Since viscous shearing of the fluid film between the bearing foils and the rotatable element is a significant source of heating of the coated foil surfaces, the supply of cooling flow from underneath the foils at the beginning of the hydrodynamic supporting wedge will reduce the operating temperature of the foil journal bearing.

BRIEF DESCRIPTION OF THE DRAWINGS

FIG. 1 is a perspective view of a foil journal bearing of the present invention;

FIG. 2 is a sectional view of the foil journal bearing taken along line 2—2 of FIG. 1;

FIG. 3 is a perspective view of a individual foil of the foil journal bearing of FIG. 1 having a single row of openings;

FIG. 4 is a perspective view of an alternate individual foil of the journal bearing of FIG. 1 having two rows of openings;

FIG. 5 is an enlarged fragmentary sectional view illustrating an individual foil opening in the vicinity of the foil overlap; and FIG. 6 is an enlarged fragmentary sectional view illustrating the foil openings of the alternate individual foil of FIG. 4 in relation to the upper ridges of the undersprings.

DESCRIPTION OF THE PREFERRED EMBODIMENTS

As generally illustrated in FIG. 1, the journal bearing 10 includes a shaft 12 rotatably supported within a bushing 14 by means of a foil bearing 16. The foil bearing 16, shown in FIG. 2, generally comprises a plurality of individual, overlapping compliant foils 20 and a like number of individual foil stiffener elements or undersprings 22. Both the foils 20 and undersprings 22 are mounted in axial slots 24 in the bushing 14 in a conventional manner. While the individual curved foils 20, normally of a thin compliant metallic material are illustrated as having a separate mounting bar 26 at the leading edge thereof, the mounting means may be formed integral with the individual foils or with the foils 20 having mounting means intermediate the ends thereof as shown in U.S. Pat. No. 4,178,046.

The underspring 22, also normally of a thin compliant metallic material, generally has a predetermined curvature greater than the curvature of the individual foils 20 and includes a plurality of axially extending upper ridges 28 alternately disposed with a plurality of axially extending lower ridges 30. The function of the undersprings 22 is described in detail in U.S. Pat. Nos. 4,153,315 and 4,195,395.

As best illustrated in FIG. 3, each individual foil 20 includes a plurality of cooling holes 32. The holes 32 are generally aligned in an axial row in the vicinity of the beginning of the hydrodynamic supporting wedge just past the trailing edge 34 of the adjacent overlapping foil as shown in FIGS. 2 and 5. In this position, the cooling flow can mix with the bearing film flow without adversely affecting the hydrodynamic pressure buildup from the relative rotation of the shaft 12 and bushing 14. The diameter of the cooling holes 32 may be on the order of 0.1 inches in diameter but may range from 0.01 to 0.50 inches. The holes would generally be sized to provide sufficient cooling flow to materially reduce the temperature of the foil bearing surface without adversely affecting the hydrodynamic wedge or the compliance of the individual foils.

In order to prevent an upper ridge 28 of the underspring 22 from restricting the flow of cooling flow through the cooling holes 32, the axial row of holes 32 would be positioned, during the operating configuration of the foil bearing 16, to be between adjacent upper ridges 28 as illustrated in FIG. 5.

The alternate individual foil 20' of FIG. 4, includes two axial rows of cooling holes 42, with the cooling holes in the axial row closest to the trailing edge of foil 20' generally between the cooling holes in the axial row farthest from the trailing edge. Each of the axial rows of cooling holes 42 would be disposed over an opening between two upper ridges of the underfoil beneath the foil 20' with an upper ridge between the axial rows as shown in FIG. 6.

In this manner, by providing cooling holes in the individual foil, such that the cooling flow will mix with the bearing film flow, the operating temperature of the journal bearing can be reduced. While specific embodiments of the invention have been illustrated and described, it is to be understood that these are provided by way of example only and that the invention is not to be construed as being limited thereto but only by the proper scope of the following claims.

I claim:

1. A fluid film journal bearing comprising:
   a pair of members arranged for relative rotation with respect to one another; and
   a compliant foil bearing disposed between said pair of relatively rotatable members, said compliant foil bearing including a plurality of overlapping individual foil elements mounted on one of said pair of members and having a plurality of cooling holes configured in an axially extending row and between 0.01 inches and 0.50 inches in diameter.

2. The fluid film journal bearing of claim 1 wherein the axially extending row of cooling holes in said individual foil emements is disposed in the vicinity of where adjacent foil elements overlap.

3. The fluid film journal bearing of claim 1 wherein the cooling holes in said individual foil elements are generally 0.10 inches in diameter.

4. A fluid film journal bearing comprising:
   a pair of members arranged for relative rotation with respect to one another; and
   a compliant foil bearing operably disposed between said pair of relatively rotatable members, said compliant foil bearing including a plurality of overlapping individual foil elements mounted on one of said pair of members and having a plurality of cooling holes configured in an axially extending row in the vicinity of where adjacent foil elements overlap.

5. The fluid film journal bearing of claim 4 and in addition a second axially extending row of cooling holes in said individual foil element axially displaced from the other row of cooling holes.

6. A fluid film journal bearing comprising:
   a bushing;
   a shaft rotatably supported within said bushing; and
   a compliant foil bearing operating disposed within said bushing, said compliant foil bearing including a plurality of individual foil elements mounted within said bushing and having the trailinq edge thereof overlapping the leading edge of the adjacent foil element and a plurality of individual foil stiffener elements with individual foil stiffener elements within said housing bushing underneath individual foil elements and having alternating upper ridges and lower ridges extending generally radially therefrom, said individual foil elements having at least one axially extending row of cooling holes therein just beyond where the trailing edge of the adjacent foil overlaps and generally disposed between adjacent upper ridges of said individual foil stiffener elements, said cooling holes to provide fluid from beneath the foil elements to the bearing surface.

7. The fluid film journal bearing of claim 6 wherein the cooling holes in said individual foil elements are between 0.01 inches and 0.50 inches in diameter.

8. The fluid film journal bearing of claim 7 wherein the cooling holes in said individual foil elements are generally 0.10 inches in diameter.

9. The fluid film journal bearing of claim 6 wherein the number of axially extending rows of cooling holes is two and the cooling holes in one row are axially displaced from the cooling holes in the other row.

10. A fluid film journal bearing comprising:
    a bushing;
    a shaft rotatably supported within said bushing; and
    a compliant foil bearing operably disposed within said bushing, said compliant foil bearing including a plurality of individual arcuate foil elements mounted within said bushing and having the trailing edge thereof overlapping the adjacent foil element, and a plurality of individual foil stiffener elements having alternating upper ridges and lower ridges extending generally radially therefrom with individual foil stiffener elements mounted within said bushing underneath individual foil elements, said individual foil elements having at least one axially extending row of cooling holes therein just beyond where the trailing edge of the adjacent foil element overlaps to provide fluid from beneath the foil element to the bearing surface thereof, the at least one row of cooling holes having a diameter of between 0.01 inches and 0.50 inches disposed between adjacent upper ridges in said foil stiffener element beneath the foil element.

11. The fluid film journal bearing of claim 10 wherein the cooling holes in the arcuate foil elements are generally 0.10 inches in diameter.

12. A fluid film journal bearing comprising:
    a bushing;
    a shaft rotatably supported within said bushing; and a compliant foil bearing operably disposed within said bushing, said compliant foil bearing including a plurality of individual foil elements mounted within said bushing and having the trailing edge thereof overlapping the leading edge of the adjacent foil element and a plurality of individual foil stiffener elements having alternating upper ridges and lower ridges extending generally radially therefrom with individual foil stiffener elements mounted within said bushing underneath individual foil elements, said individual foil elements having at least two axially extending rows of cooling holes therein beyond where the trailing edge of the adjacent foil element overlaps to provide fluid from beneath the foil element to the bearing surface thereof, the rows of cooling holes each disposed between adjacent upper ridges in said foil stiffener element with an upper ridge disposed between adjacent rows of cooling holes.

13. The fluid film journal bearing of claim 12 wherein the cooling holes in the individual foil elements are between 0.01 inches and 0.50 inches in diameter.

14. The fluid film bearing of claim 13 wherein the cooling holes in the individual foil elements are generally 0.10 inches in diameter.

* * * * *